(12) United States Patent
Seong

(10) Patent No.: US 10,115,934 B2
(45) Date of Patent: Oct. 30, 2018

(54) BATTERY PACK

(71) Applicant: Samsung SDI Co., Ltd., Yongin-si, Gyeonggi-do (KR)

(72) Inventor: Jae-Il Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 762 days.

(21) Appl. No.: 14/531,903

(22) Filed: Nov. 3, 2014

(65) Prior Publication Data

US 2015/0228935 A1    Aug. 13, 2015

(30) Foreign Application Priority Data

Feb. 13, 2014 (KR) .................. 10-2014-0016797

(51) Int. Cl.
*H01M 2/02* (2006.01)
*H01M 2/04* (2006.01)
*H01M 2/08* (2006.01)

(52) U.S. Cl.
CPC ....... *H01M 2/0202* (2013.01); *H01M 2/0404* (2013.01); *H01M 2/08* (2013.01); *H01M 2002/0205* (2013.01); *H01M 2220/30* (2013.01); *Y10T 29/4911* (2015.01)

(58) Field of Classification Search
CPC ........ H01M 2/02; H01M 2/0202; H01M 2/04; H01M 2/08; H01M 2/30; H01M 2/0205; Y10T 29/4911
USPC ........................................................ 429/129
See application file for complete search history.

(56) References Cited

U.S. PATENT DOCUMENTS

| 6,020,086 A * | 2/2000 | Van Lerberghe ... | H01M 2/0207 429/127 |
| 7,960,055 B2 * | 6/2011 | Uh ..................... | H01M 2/0404 29/623.1 |
| 2003/0017390 A1 | 1/2003 | Probst et al. | |
| 2006/0040178 A1 * | 2/2006 | Probst ................. | A61N 1/375 429/176 |
| 2006/0093907 A1 * | 5/2006 | Jeon .................... | H01M 2/0404 429/180 |
| 2006/0099490 A1 * | 5/2006 | Cho .................... | H01M 2/0207 429/53 |

(Continued)

FOREIGN PATENT DOCUMENTS

| CN | 104810485 A | 7/2015 |
| KR | 10-2003-0066243 A | 8/2003 |
| KR | 10-2011-0047614 A | 5/2011 |

OTHER PUBLICATIONS

Chinese Office Action, with English translation, dated May 14, 2018, for corresponding Chinese Patent Application No. 201510053034.1 (16 pages).

*Primary Examiner* — Jonathan G Jelsma
*Assistant Examiner* — Rashid A Alam
(74) *Attorney, Agent, or Firm* — Lewis Roca Rothgerber Christie LLP

(57) ABSTRACT

A battery pack including a can having an opening; an electrode assembly accommodated in the can; a cap plate closing the opening and including a protruding anchor portion; and an insulation plate having an anchor hole accommodating the anchor portion, wherein the anchor hole is a slot and is configured to allow movement of the anchor portion within the anchor hole when pressure is applied to the can and the cap plate.

19 Claims, 5 Drawing Sheets

(56) References Cited

U.S. PATENT DOCUMENTS

| | | | |
|---|---|---|---|
| 2006/0141355 A1* | 6/2006 | Kang | H01M 2/0404 |
| | | | 429/182 |
| 2011/0104556 A1 | 5/2011 | Kim et al. | |
| 2013/0136962 A1* | 5/2013 | Seong | H01M 2/0404 |
| | | | 429/61 |
| 2015/0214511 A1 | 7/2015 | Seong | |

* cited by examiner

BATTERY PACK

CROSS-REFERENCE TO RELATED APPLICATION

This application claims priority to and the benefit of Korean Patent Application No. 10-2014-0016797, filed on Feb. 13, 2014, in the Korean Intellectual Property Office, the disclosure of which is incorporated herein in its entirety by reference.

BACKGROUND

1. Field

One or more embodiments of the present invention relate to battery packs.

2. Description of the Related Art

Developments in wireless Internet and wireless communication technology prompted a fast growth of the market for portable electronic equipment such as mobile phones, game consoles, portable multimedia players (PMP), mpeg audio layer-3 (MP3) players, smartphones, smart pads, electronic book terminals, flexible tablet computers, and wearable medical equipment.

For example, mobile computers are compact and easy to carry, and are widely used for both work and personal purposes. Mobile computers generally include a battery pack as a power supply device. A typical battery pack may include a plurality of unit batteries that may be repeatedly charged and discharged in order to provide sufficient power output.

Recent technological developments have increased the demand for battery packs suitable for many types of mobile electronic appliances, including, for example, curved battery packs suitable for curved mobile electronic appliances.

SUMMARY

One or more embodiments of the present invention are directed to a battery pack that maintains stability during curving.

Additional aspects will be set forth in part in the description which follows and, in part, will be apparent from the description, or may be learned by practice of the presented embodiments.

According to one or more embodiments of the present invention, a battery pack includes: a can having an opening; an electrode assembly accommodated in the can; a cap plate closing the opening and including a protruding anchor portion; and an insulation plate having an anchor hole accommodating the anchor portion, wherein the anchor hole is a slot and is configured to allow movement of the anchor portion within the anchor hole when pressure is applied to the can and the cap plate.

The anchor hole may be asymmetrical with respect to a central line along a lengthwise direction of the insulation plate.

The cap plate may have a first concave lateral surface and a second convex lateral surface, and the first and second lateral surfaces may be substantially aligned with each other.

A distance from the central line of the insulation plate to an end of the anchor hole near the second lateral surface may be smaller than a distance from the central line of the insulation plate to an end of the anchor hole near the first lateral surface.

A plurality of anchor holes may be formed and may include: a first anchor hole at a first side of the insulation plate spaced from a center of the can; and a second anchor hole at a second side of the insulation plate opposite to the first side and spaced from the center of the can.

A first distance between the center of the can and the first anchor hole and a second distance between the center of the can and the second anchor hole may be different.

The first distance may be greater than the second distance.

In the first anchor hole, a line passing through the center of the first anchor hole in a lengthwise direction is at a predetermined angle to the central line of the insulation plate.

The insulation plate may include a mounting portion accommodating a terminal plate, wherein a distance between a side of the mounting portion adjacent to the first anchor hole and an inner edge of the first anchor hole decreases from the second lateral surface toward the first lateral surface.

A width of the first anchor hole may increase from the second lateral surface toward the first lateral surface.

The anchor portion may include a first anchor portion accommodated in the first anchor hole and a second anchor portion accommodated in the second anchor hole.

A cross-section of the first anchor portion may be greater than a cross-section of the second anchor portion.

The cap plate may include a first cap plate that electrically insulates the electrode assembly and a second cap plate on the first cap plate, wherein the anchor portion is on at least one of the first cap plate and the second cap plate.

The anchor hole may include an open end accommodating the anchor portion and coupling the anchor portion to the insulation plate.

The first lateral surface and the second lateral surface of the cap plate may have different curvature radii.

A difference between the curvature radii of the first lateral surface and the second lateral surface may be about 10 mm to about 30 mm.

The cap plate may be welded to the can from an upper portion of the cap plate along an external surface of the cap plate.

According to one or more embodiments of the present invention, a battery pack includes: a can having an opening; an electrode assembly accommodated in the can; a cap plate closing the opening of the can, the cap plate including a protruding anchor portion; and an insulation plate having an anchor hole accommodating the anchor portion, wherein the cap plate is curved and includes a first concave lateral surface and a second convex lateral surface, wherein a shortest distance from the first lateral surface to an end of the anchor hole nearer the first lateral surface is smaller than a shortest distance between the second lateral surface and an end of the anchor hole nearer the second lateral surface.

According to one or more embodiments of the present invention, a method of manufacturing a battery pack, includes: placing an electrode assembly inside a can having an opening; fixing an insulation plate to a cap plate and installing the cap plate to cover the opening of the can; bonding the cap plate and the can by welding along the edge of the opening of the can; and curving the can and the cap plate by applying pressure to the can and the cap plate, wherein the cap plate includes a protruding anchor portion, and the insulation plate includes an anchor hole accommodating the anchor portion, and the anchor portion moves within the anchor hole when applying a pressure to the can and the cap plate.

The bonding of the cap plate and the can by welding may include bonding the cap plate and the can by welding the cap plate from an upper portion of the cap plate along an external surface of the cap plate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
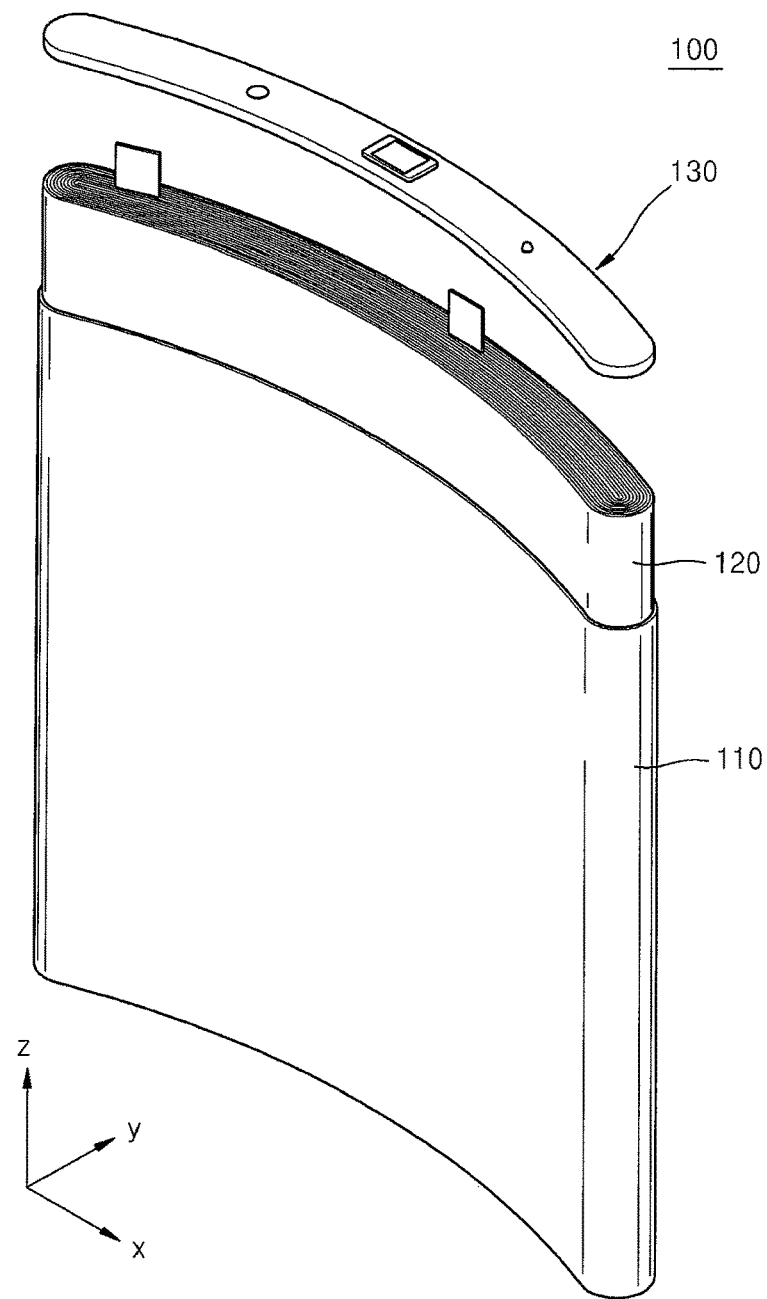
FIG. 1 is a partially exploded perspective view illustrating a battery pack according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention.

As the inventive concept allows for various changes and many different forms, particular embodiments will be illustrated in the drawings and described in detail in the written description. The advantages and features of the present invention and methods of achieving the advantages and features will be described more fully with reference to the accompanying drawings, in which exemplary embodiments of the invention are shown. The invention may, however, be embodied in many different forms and should not be construed as being limited to the embodiments set forth herein.

It will also be understood that although the terms "first", "second", etc. may be used herein to describe various components, these components should not be limited by these terms. These components are only used to distinguish one component from another.

Singular expressions, unless defined otherwise, include plural expressions.

It will be further understood that the terms "comprise" and/or "have" used herein specify the presence of stated features or components, but do not preclude the presence or addition of one or more other features or components.

It will also be understood that when an element such as a layer, an area, or a component is referred to as being "on" or "on the top of" another element, it can be directly on or directly on the top of the other element, or intervening layers, areas, or components may also be present.

In the embodiments below, an x-axis, a y-axis, and a z-axis are not limited to three axes on a rectangular coordinates system but may be construed as including these axes. For example, an x-axis, a y-axis, and a z-axis may be at right angles or may also indicate different directions from one another, which are not at right angles.

In the drawings, for convenience of description, sizes of elements may be exaggerated or contracted. In other words, since sizes and thicknesses of components in the drawings are arbitrarily illustrated for convenience of description, the following embodiments are not limited thereto.

Figure 2:
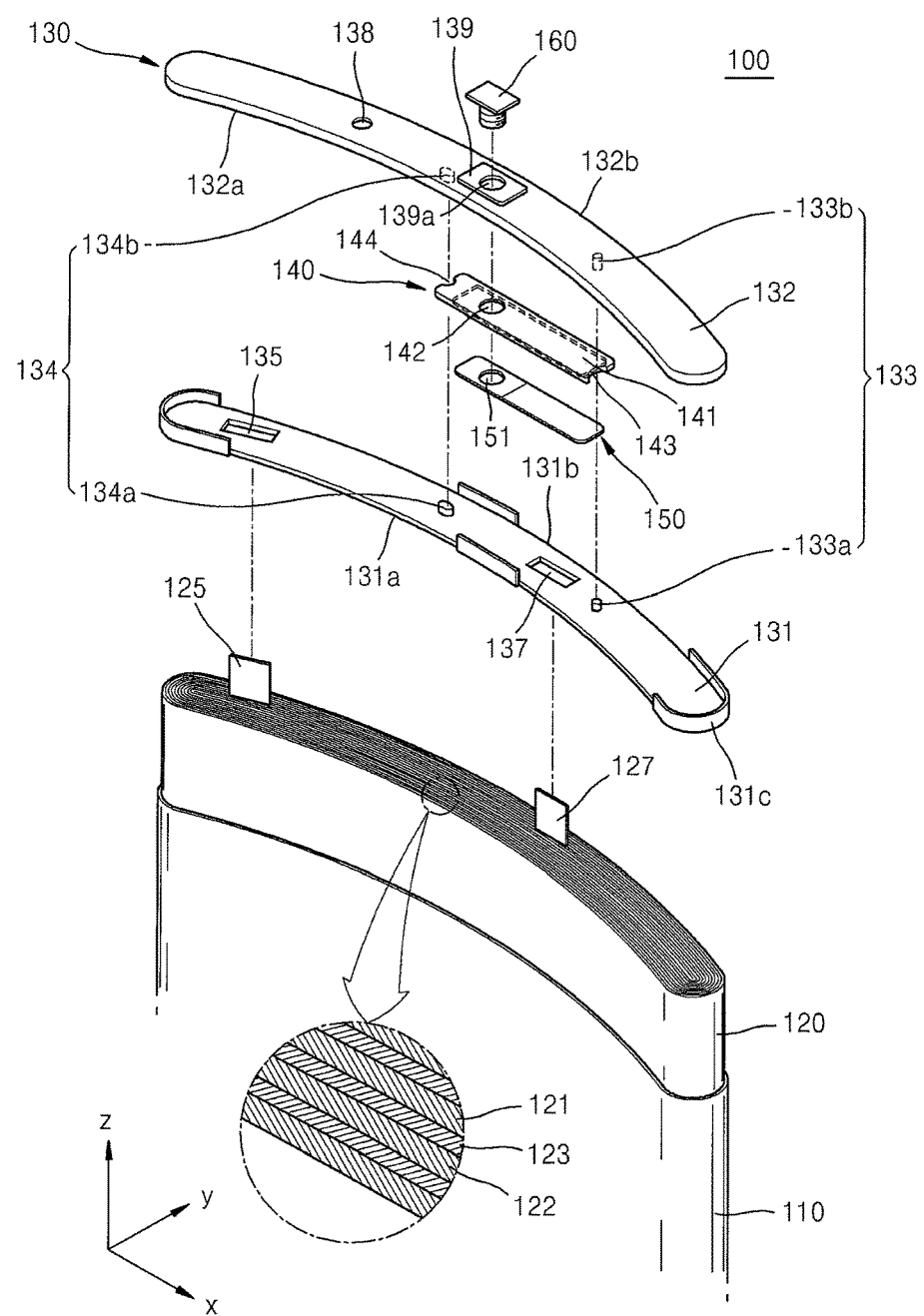
FIG. 2 is a partially exploded perspective view illustrating the battery pack of FIG. 1.
Figure 3:
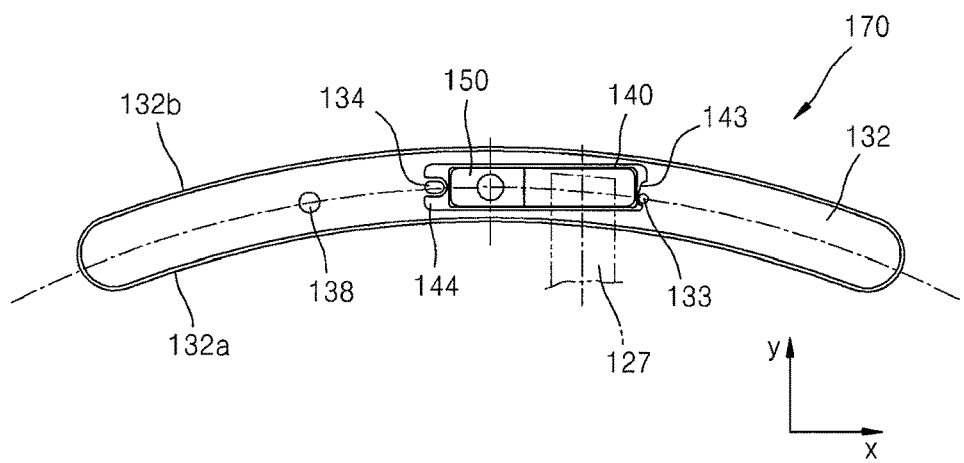
FIG. 3 is a bottom view schematically illustrating a cap plate of FIG. 2.

FIG. 1 is a schematic exploded perspective view illustrating a battery pack 100 according to an embodiment of the present invention. FIG. 2 is a schematic exploded perspective view illustrating the battery pack 100 of FIG. 1. FIG. 3 is a bottom view schematically illustrating a cap plate 130 of FIG. 2.

Referring to FIGS. 1 through 3, the battery pack 100 may include a can 110, an electrode assembly 120, a cap plate 130, an insulation plate 140, a terminal plate 150, and an electrode pin 160. The battery pack 100 may be a rechargeable secondary battery such as, for example, a lithium-ion battery.

The case 110 may have an approximately hexahedral shape with an opening in an upper portion thereof, and the can 110 may be curved. The case 110 may be formed of a metallic material, in order to provide rigidity. For example, the can 110 may be formed of aluminum or an aluminum alloy, but the material for forming the can 110 is not limited thereto. After the electrode assembly 120 is inserted into the can 110 through the opening of the can 110, the opening may be encapsulated using the cap plate 130.

The electrode assembly 120 may include a first electrode layer 121, a second electrode layer 122, and a separator 123 between the first electrode layer 121 and the second electrode layer 122. The electrode assembly 120 may have a structure in which a plurality of first electrode layers 121, second electrode layers 122, and separators 123 are stacked. For example, the electrode assembly 120 may have a jelly-roll structure in which the first electrode layers 121, the second electrode layers 122, and the separators 123 are wound around one another, but the structure of the electrode assembly 120 is not limited thereto. Herein, solely for convenience of description, a jelly-roll structure of the electrode assembly 120 will be described.

The first electrode layer 121 may be one of a positive electrode film and a negative electrode film. When the first electrode layer 121 is a positive electrode film, the second electrode layer 122 may be a negative electrode film, and when the first electrode layer 121 is a negative film, the second electrode layer 122 may be a positive electrode film. In other words, the first electrode layer 121 and the second electrode layer 122 may have different polarities and neither is limited to a specific polarity. However, solely for convenience of description, the first electrode layer 121 formed of a positive electrode film and the second electrode layer 122 formed of a negative electrode film will be described.

The first electrode layer 121 may include a first metal collector and a first active material portion formed by coating a first active material on the surface of the first metal collector. Likewise, the second electrode layer 122 may include a second metal collector and a second active material portion formed by coating a second active material on the surface of the second metal collector.

When the first electrode layer 121 is a positive electrode film, the first metal collector may be a positive electrode collector, and the first active material portion may be a positive active material portion. Accordingly, the second electrode layer 122 is a negative electrode film, and the second metal collector may be a negative electrode collector, and the second active material portion may be a negative active material portion. The material and structure of each of the positive electrode collector, the positive electrode active material portion, the negative electrode collector, and the negative electrode active material portion may be any material and structure suitable for use in a secondary battery, and thus detailed descriptions of the materials and structures of the positive electrode collector, the positive electrode active material portion, the negative electrode collector, and the negative electrode active material portion will not be provided here.

The separator 123 may be a porous polymer layer such as a polyethylene film or a polypropylene film, and may be in the form of a woven or nonwoven fiber including, without limitation, polymer fibers. In addition, the separator 123 may include ceramic particles, and may be formed of a polymer solid electrolyte. The separator 123 may be a separately formed film or may be formed by forming a nonconductive porous layer on the first electrode layer 121 or the second electrode layer 122.

In one embodiment, the separator 123 electrically separates the first electrode layer 121 and the second electrode layer 122 from each other, and the form of the separator 123 may be different from the form of the first electrode layer 121 or the second electrode layer 122.

A first electrode plate 125 and a second electrode plate 127 having different polarities may be included. In one embodiment, the first and second electrode plates 125 and 127 enable the electrode assembly 120 to be electrically connected to the outside source. In one embodiment, the first electrode plate 125 is electrically connected to the first electrode layer 121 to have a positive polarity, and the second electrode plate 127 is electrically connected to the second electrode layer 122 to have a negative polarity.

In one embodiment, the cap plate 130 hermetically seals the opening of the can 110 to protect the electrode assembly 120 installed in the can 110. The cap plate 130 may include a first cap plate 131 that closes the opening of the can 110 and a second cap plate 132 on the first cap plate 131.

Similar to the can 110, the cap plate 130 may be formed of aluminum or a metallic material such as an aluminum alloy. A region where the cap plate 130 and the can 110 contact may be welded from an upper portion of the cap plate 130 along an external surface of the cap plate 130 so as to bond the cap plate 130 and the can 110, thereby tightly sealing the can 110.

In one embodiment, the cap plate 130 includes first lateral surfaces 131a and 132a that are concave (i.e. curved inward) and second lateral surfaces 131b and 132b that are convex (i.e. curved outward), and the first lateral surfaces and the second lateral surfaces are substantially aligned with each other, such that the concave portion of the first lateral surface corresponds to the convex portion of the respective second lateral surface. In one embodiment, the first lateral surfaces include a first cap plate inner surface and a second cap plate inner surface. The second lateral surfaces include a first cap plate outer surface and a second cap plate outer surface. In particular, the first cap plate inner surface is formed to correspond to the second cap plate inner surface, and the first cap plate outer surface is formed to correspond to the second cap plate outer surface. The first lateral surfaces 131a and 132a of the cap plate 130 may be concave, and the second lateral surfaces 131b and 132b of the cap plate 130 may be convex. A curvature radius of the first lateral surfaces 131a and 132a may be different from the curvature radius of the second lateral surfaces 131b and 132b. In one embodiment, the difference between the curvature radii of the first lateral surfaces 131a and 132a and the second lateral surfaces 131b and 132b may be from about 10 mm to about 30 mm. If the difference in the curvature radii is less than 10 mm, the can 110 may be too narrow to install the electrode assembly 120. If the difference in the curvature radii is greater than 30 mm, a relatively large external force has to be applied to the can 110 and the cap plate 130 in order to form a curvature in the battery pack 100, thus increasing the risk of damage to the battery 100 due to the external force, as well as increasing energy consumption.

In one embodiment, the first cap plate 131 electrically insulates the electrode assembly 120 from the outside. In one embodiment, the first cap plate 131 is formed of an insulating material and includes a first hole 135 through which the first electrode plate 125 passes and a second hole 137 through which the second electrode plate 127 passes. The first hole 135 and the second hole 137 are spaced apart from each other so as not to contact each other, and to separate the first electrode plate 125 and the second electrode plate 127 having different polarities.

The first cap plate 131 may include a rib 131c protruding from the lateral surface of the first cap plate 131 and supporting the second cap plate 132. When the second cap plate 132 is mounted on the first cap plate 131, rib 131c may act to hold the first cap plate 131 and the second cap plate 132 together and to prevent (or reduce) separation of the first cap plate 131 from the second cap plate 132.

The second cap plate 132 may be installed on the first cap plate 131 to be electrically connected to the first electrode plate 125. In addition, the electrode pin 160 may be positioned on the second cap plate 132. The electrode pin 160 may be inserted into terminal through-holes 139a, 142, and 151 respectively formed in the second cap plate 132, the insulation plate 140, and the terminal plate 150, and the electrode pin 160 may be electrically connected to the second electrode plate 127 of the electrode assembly 120. When the electrode pin 160 is inserted into the terminal through-hole 139a of the second cap plate 132, the electrode pin 160 is electrically insulated from the second cap plate 132 via a gasket 139.

The first electrode plate 125 may be electrically connected to the second cap plate 132, and the second electrode plate 127 may electrically contact the terminal plate 150and thus may be electrically connected to the electrode pin 160. Since the first electrode plate 125 and the second electrode plate 127 have different polarities, the second cap plate 132 and the electrode pin 160 respectively connected to the first electrode plate 125 and the second electrode plate 127 also have different polarities.

In order to prevent a short circuit between the electrode pin 160 and the second cap plate 132, the gasket 139 may be positioned between the electrode pin 160 and the second cap plate 132. The gasket 139 may be formed of an insulating material and may prevent an electrical short circuit between the electrode pin 160 and the second cap plate 132.

In one embodiment, the terminal through-hole 139a is formed in a center portion of the second cap plate 132. When the electrode pin 160 is inserted into the terminal through-hole 139a, the electrode pin 160 is electrically insulated from the second cap plate 132 by the gasket 139, and electrically contacts the terminal plate 150.

An electrolyte solution inlet 138 may be formed in the second cap plate 132. In embodiments where the can 110 has been hermetically sealed, an electrolyte solution is injected into the can 110 through the electrolyte solution inlet 138. After the electrolyte solution has been injected, the electrolyte solution inlet 138 may be sealed by using a sealing stopper.

The cap plate 130 may include a first anchor portion 133 and a second anchor portion 134 that are protruding to support the insulation plate 140. The first anchor portion 133 and the second anchor portion 134 may be formed on at least one of the first cap plate 131 and the second cap plate 132 and may be respectively inserted into a first anchor hole 143 and a second anchor hole 144 of the insulation plate 140, such that the first anchor portion 133 and second anchor portion 134 are disposed between the first cap plate 131 and the second cap plate 132. Hereinafter, solely for convenience of description, the focus will be on an embodiment in which the first anchor portion 133 and second anchor portion 134 are formed on the second cap plate 132.

The first anchor portion 133 and second anchor portion 134 may be included to support the insulation plate 140 within the cap plate 130. In one embodiment, the insulation plate 140 is disposed on the second electrode plate 127 in order to insulate the second electrode plate 127 that is electrically connected to terminal plate 150 from the second cap plate 132. The first anchor portion 133 is positioned away from a center and towards the edge of the can 110, and the second anchor portion 134 is positioned near the center of the can 110. In one embodiment, a cross-section of the second anchor portion 134 may be greater than a cross-section of the first anchor portion 133, so that the insulation plate 140 may be firmly supported within the cap plate 130 in the center portion of the can 110.

The insulation plate 140 may be positioned between the first cap plate 131 and the second cap plate 132 and may be formed of the same insulation material as the gasket 139, but the material for forming the insulation plate 140 is not limited thereto. The terminal through-hole 142, through which the electrode pin 160 is inserted, is formed in the insulation plate 140 at a position substantially corresponding to the position of the terminal through-hole 139a of the second cap plate 132. In one embodiment, a mounting portion 141 is formed on a lower surface of the insulation plate 140. The mounting portion 141 may correspond to the size of the terminal plate 150, such that the terminal plate 150 can be mounted on the insulation plate 140.

In one embodiment, the terminal plate 150 is formed of a nickel (Ni) alloy and is coupled to the lower surface of the insulation plate 140. The terminal through-hole 151, into which the electrode pin 160 is inserted, is formed in the terminal plate 150 at a position substantially corresponding to the position of the terminal through-hole 139a of the second cap plate 132. In one embodiment, the electrode pin 160, after passing through the terminal through-hole 139a of the second cap plate 132, is inserted into the terminal through-hole 151. Since the electrode pin 160 is electrically insulated from the second cap plate 132 via the gasket 139 and is electrically coupled to the terminal plate 150, the terminal plate 150 may be electrically insulated from the second cap plate 132 and electrically connected to the electrode pin 160.

Figure 4:
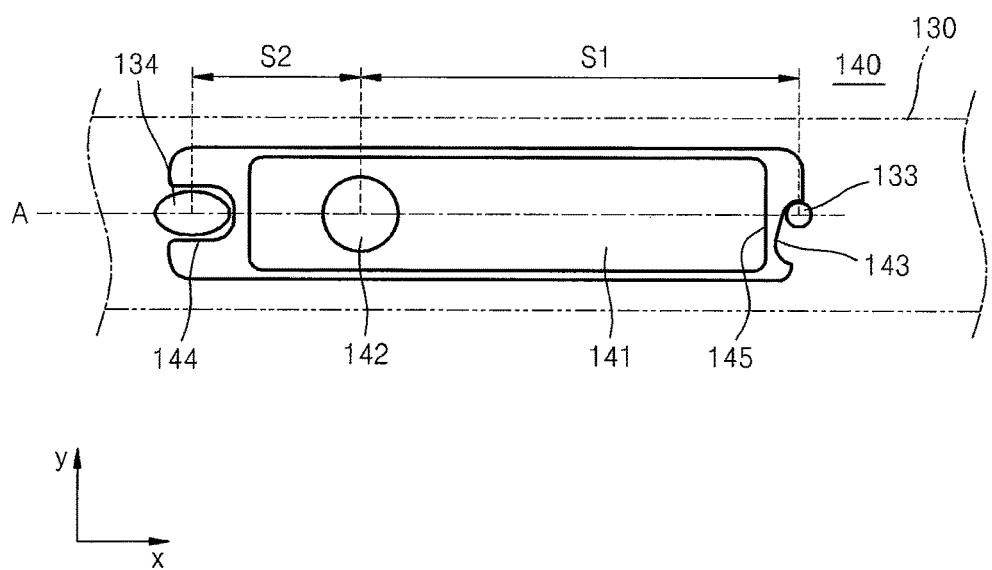
FIGS. 4 and 5 are bottom plan views illustrating an insulation plate of FIG. 2 according to an embodiment of the present invention.
Figure 5:
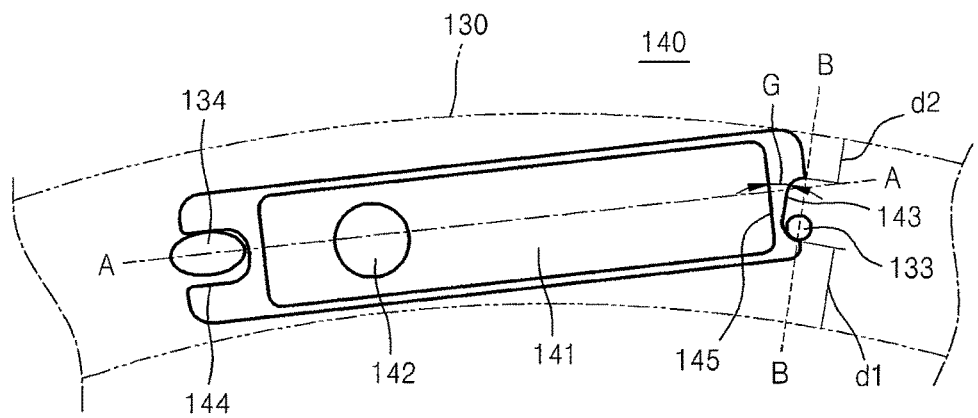

FIGS. 4 and 5 are exploded bottom plan views illustrating the insulation plate 140 of FIG. 2, according to one embodiment of the present invention. FIG. 4 shows the structure of the insulation plate 140 and the first and second anchor portions 133 and 134 before the cap plate 130 is molded by applying an external force, and FIG. 5 shows the structure of the first and second anchor portions 133 and 134 of the insulation plate 140 after the cap plate 130 is curvedly molded by applying an external force.

Referring to FIGS. 4 and 5, according to one embodiment of the present invention, the insulation plate 140 may include a mounting portion 141 on which the terminal plate 150 is installed, a terminal through-hole 142 through which the electrode pin 160 is inserted, a first anchor hole 143 into which the first anchor portion 133 is inserted, and a second anchor hole 144 into which the second anchor portion 134 is inserted. In one embodiment, the first anchor hole 143 and the second anchor hole 144 may each be open at one end, and the first anchor portion 133 and the second anchor portion 134 may be inserted into the open ends of the first anchor hole 143 and second anchor hole 144, respectively, to be coupled to the insulation plate 140.

In one embodiment, the first anchor hole 143, formed at a first side of the insulation plate 140, is positioned away from the center of the can 110, and the second anchor hole 144, formed at a second side of the insulation plate 140 opposite to the first side of the insulation plate 140, is positioned near the center of the can 110.

Accordingly, when the insulation plate 140 is placed between the first cap plate 131 and the second cap plate 132, a first distance S1 between the center of the can 110 and the first anchor hole 143 is greater than a second distance S2 between the center of the can 110 and the second anchor hole 144.

The first anchor hole 143 may be in the form of a slot such and may be larger in diameter than the first anchor portion 133, such that the first anchor portion 133 may move along the edge of the first anchor hole 143, when the can 110 and the cap plate 130 are being curved. In other words, when pressure is applied to the can 110 and the cap plate 130, the second anchor portion 134 is substantially fixed inside the second anchor hole 144, and the first anchor portion 133 may move along the edge of first anchor hole 143 between the first and second lateral surfaces, without interference from the insulation plate 140.

The first anchor hole 143 may be asymmetrically formed with respect to a central line A of the insulation plate 140 along a lengthwise direction of the insulation plate 140, as illustrated in FIGS. 4 and 5. In other words, the distance from the central line A of the insulation plate 140 to the second end of the first anchor hole 143 closer to the second lateral surfaces 131b and 132b may be smaller than the distance from the central line A of the insulation plate 140 to the first end of the first anchor hole 143 closer to the first lateral surfaces 131a and 132a. Accordingly, the first anchor hole 143 may extend toward the first lateral surfaces 131a and 132a, and the first anchor portion 133 may move along the edge of the first anchor hole 143 toward the first lateral surfaces 131a and 132a. In one embodiment, the shortest distance d1 between the first lateral surfaces 131a and 132a and the first end of the first anchor hole 143 may be greater than the shortest distance d2 between the second lateral surfaces 131b and 132b and the second end of the first anchor hole 143.

As illustrated in FIG. 5, the central line A of the insulation plate 140 and a central line B extending along a lengthwise direction of the first anchor hole 143 may be at a predetermined angle. In addition, the width of the first anchor hole 143 may gradually increase from the second lateral surfaces 131b and 132b toward the first lateral surfaces 131a and 132a. Accordingly, the first anchor portion 133 can easily move toward the first lateral surfaces 131a and 132a along the edge of the first anchor hole 143, when the cap plate 130 is curved. In one embodiment, the shortest distance G between a lateral surface 145 of the mounting portion 141 that is adjacent to the first anchor hole 143 and the inner edge of the first anchor hole 143 may gradually decrease from the second lateral surfaces 131b and 132b to the first lateral surfaces 131a and 132a.

In one embodiment, the battery pack 100 may be formed by manufacturing each of the respective elements for the battery pack 100 in a curved form and then assembling these elements. Alternatively, a flat battery pack may be assembled first and then an external force may be applied to the battery pack 100 to form the battery pack 100 having a curved form. Hereinafter, solely for convenience of description, the focus will be on a method of manufacturing a curved battery pack 100 by applying pressure to the flat battery pack 100.

In one embodiment, the electrode assembly 120 may be placed inside the can 110 through an opening in the can 110. The insulation plate 140 may be fixed to the cap plate 130, and the cap plate 130 together with the insulation plate 140 may be installed on the opening of the can 110. The cap plate 130 and the can 110 may be bonded by welding along the edges of the opening of the can 110, and then pressure. may be applied to the can 110 and the cap plate 130 to curve the can 110 and the cap plate 130.

When bonding the cap plate 130 and the can 110 by welding, the cap plate 130 may be welded from an upper portion of the cap plate 130 along an external surface of the cap plate 130. A welding instrument and the cap plate 130 may be arranged to be perpendicular to each other, or the welding instrument may be obliquely placed at a predetermined angle with respect to the cap plate 130. By bonding the cap plate 130 and the can 110 in the same plane and arranging the welding instrument at a predetermined height, welding time may be reduced to thereby increase operation efficiency.

In embodiments where the pressure is applied to the can 110 and the cap plate 130, the first anchor portion 133 protruding from the second cap plate 132 is inserted into the first anchor hole 143 of the insulation plate 140, and the first anchor portion 133 moves along the edge of the first anchor hole 143. The second anchor portion 134 is substantially fixed by the second anchor hole 144.

In embodiments where the first anchor portion 133 is guided along the edge of the first anchor hole 143, the resulting battery pack 100 including the insulation plate 140 may maintain stability when the pressure is applied to the external surface of the battery pack 100 to curvedly form the battery pack 100.

In addition, when the first anchor hole 143 in which the first anchor portion 133 may move is formed, damage and separation of the insulation plate 140, that may occur when the pressure is applied to the external surface of the battery pack 100, may be minimized or reduced.

Figure 6:
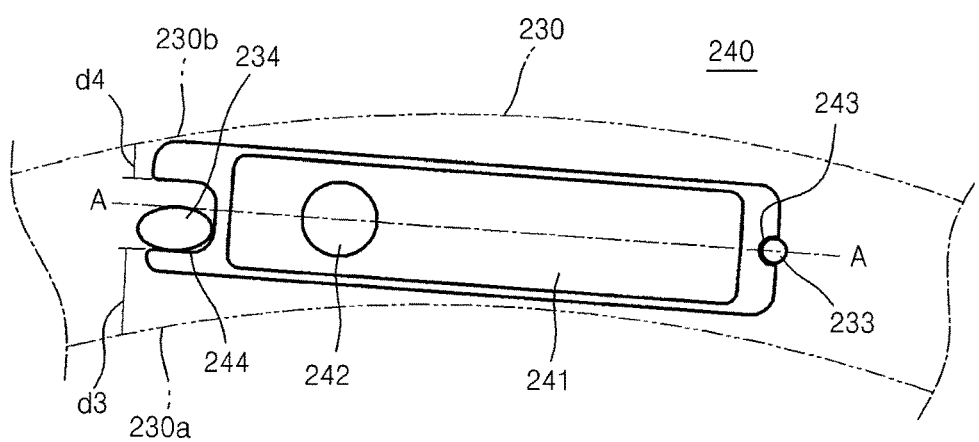
FIG. 6 is a plan view illustrating a modified insulation plate of FIG. 2 according to another embodiment of the present invention.

FIG. 6 is a plan view illustrating an insulation plate 240 according to another embodiment of the present invention. The insulation plate 240 is a modified example of the insulation plate 140 of FIG. 2. Hereinafter, like reference numerals as above denote like elements.

Referring to FIGS. 1 through 3 and 6, a battery pack according to the embodiment of the present invention illustrated in FIG. 6 may include a can 110, an electrode assembly 120, a cap plate 130, an insulation plate 240, a terminal plate 150, and an electrode pin 160. The battery pack according to the present embodiment is the same as the battery pack according to the embodiment illustrated in FIGS. 1 through 3, except for the shapes of a first anchor hole 243 and a second anchor hole 244 of the insulation plate 240 and thus, the description of the repeated elements will not be provided again and should be apparent from the description provided above in connection with the previously discussed embodiment.

The insulation plate 240 may include a mounting portion 241 on which the terminal plate 150 is installed, a terminal through-hole 124 through which the electrode pin 160 is inserted, a first anchor hole 243 into which a first anchor portion 233 is inserted, and a second anchor hole 244 into which a second anchor portion 234 is inserted. In one embodiment, the first anchor hole 243 and the second anchor hole 244 may each be open at one end, and the first anchor portion 233 and the second anchor portion 234 may be inserted into the open ends of the first anchor hole 243 and the second anchor hole 244, respectively, to be coupled to the insulation plate 240.

The second anchor hole 244 may be in the form of a slot, such that the second anchor portion 234 may move along the edge of the second anchor hole 244. In other words, when the pressure is applied to the can 110 and the cap plate 230 to curve the can 110 and the cap plate 230, the first anchor portion 233 may be substantially fixed by the first anchor hole 243, and the second anchor portion 234 may move toward a first lateral surface 230a of the cap plate 230 along the edge of the second anchor hole 244 without interference by the insulation plate 240.

The second anchor hole 244 may be asymmetrically formed with respect to a central line A of the insulation plate 240 along a lengthwise direction of the insulation plate 240, as illustrated in FIG. 6, to extend toward the first lateral surface 230a. In other words, the distance from the central line A of the insulation plate 240 to the second end of the second anchor hole 244 closer to the second lateral surface 230b may be smaller than the distance from the central line A of the insulation plate 240 to the first end of the second anchor hole 244 closer the first lateral surface 230a. Accordingly, the second anchor hole 244 may extend toward the first lateral surface 230a, and the second anchor portion 234 may move along the edge of the second anchor hole 244 toward the first lateral surface 230a. In one embodiment, the shortest distance d3 between the first lateral surfaces 230a and the first end of the second anchor hole 244 may be greater than the shortest distance d4 between the second lateral surface 230b and the second end of the second anchor hole 244.

The battery pack according to the present embodiment is formed by using the same or similar method as the method of manufacturing the battery pack 100 described above, except for the difference in the structure and position of the insulation plate 240 based on the shape of the first and second anchor holes 243 and 244 via which the first and second anchor portions 233 and 234 are guided when the pressure is applied to the external surface of the battery pack. Thus, the description of the repeated elements and/or steps will not be provided again and should be apparent from the description provided above in connection with the previously discussed embodiment.

In embodiments where an external force is applied to the battery pack, the second anchor portion 234 protruding from the cap plate 230 is inserted into the second anchor hole 244 of the insulation plate 240 and moves along the edge of the second anchor hole 244. In one embodiment, the first anchor portion 233 is substantially fixed by the first anchor hole 243.

In embodiments where the second anchor portion 234 is guided along the edge of the second anchor hole 244, the resulting battery pack including the insulation plate 240 may maintain stability when the pressure is applied to the external surface of the battery pack to curvedly form the battery pack.

In addition, when the second anchor hole 244 in which the second anchor portion 234 may move is formed, damage and separation of the insulation plate 140, that may occur when the pressure is applied to the external surface of the battery pack, may be minimized or reduced.

Figure 7:
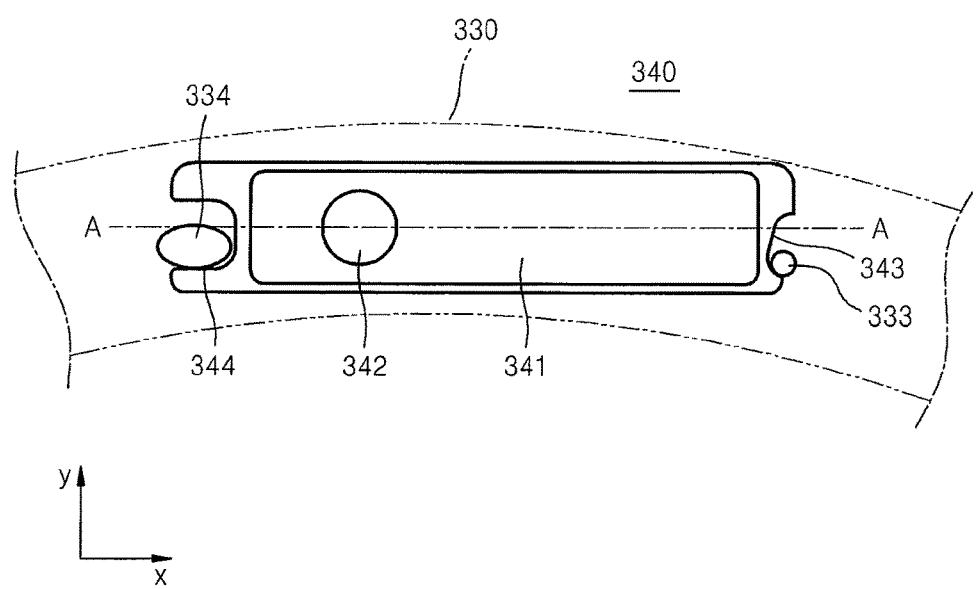
FIG. 7 is a plan view illustrating a modified insulation plate of FIG. 2 according to another embodiment of the present invention.

FIG. 7 is a plan view illustrating an insulation plate 340 according to another embodiment of the present invention. The insulation plate 340 is a modified example of the insulation plate 140 of FIG. 2. Hereinafter, like reference numerals as above denote like elements.

Referring to FIGS. 1 through 3 and 7, a battery pack according to the embodiment of FIG. 7 may include a can 110, an electrode assembly 120, a cap plate 130, an insulation plate 340, a terminal plate 150, and an electrode pin 160. The battery pack of the present embodiment is the same as the battery packs of the embodiments described above, except for the shapes of a first anchor hole 343 and a second anchor hole 344 of the insulation plate 340. Thus, the description of the repeated elements will not be provided again and should be apparent from the description provided above in connection with the previously discussed embodiments.

The insulation plate 340 may include a mounting portion 341 on which the terminal plate 150 is installed, a terminal through-hole 342 through which the electrode pin 160 is inserted, the first anchor hole 343 into which a first anchor portion 333 is inserted, and the second anchor hole 344 into which a second anchor portion 334 is inserted. In one embodiment, the first anchor hole 343 and the second anchor hole 344 may each be open at one end, and the first anchor portion 333 and the second anchor portion 334 may be inserted into the open ends of the first anchor hole 343 and the second anchor hole 344, respectively, to be coupled to the insulation plate 340.

The first anchor hole 343 may be formed as the first anchor hole 143 of the embodiment of FIGS. 4 and 5, and the second anchor hole 344 may be formed as the second anchor hole 244 of the embodiment of FIG. 6.

Thus, when the battery pack is being curved, the first anchor portion 333 may move along the edge of the first anchor hole 343, and at the same time, the second anchor portion 334 may move along the edge of the second anchor hole 344.

In embodiments where the first and second anchor portions 333 and 334 are respectively guided along the edges of the first and second anchor holes 343 and 344, the resulting battery pack including the insulation plate 340 may maintain stability when the pressure is applied to the external surface of the battery pack to curvedly form the battery pack.

In addition, when the first and second anchor holes 343 and 344, along which the first and second anchor portions 333 and 334 may move, are formed, damage and separation of the insulation plate 340, that may occur when the pressure is applied to the external surface of the battery pack, may be minimized or reduced.

According to embodiments of the present invention, modifying the shape of the battery pack to form a curvature in the battery pack corresponding to the shape of the respective electronic device, may improve space use efficiency of the electronic device.

The battery pack according to embodiments of the present invention may be curved by applying a bending force, thereby minimizing deformation of the insulation plate and maintaining the stability of the battery pack.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A battery pack comprising: a can having an opening; an electrode assembly accommodated in the can; a cap plate closing the opening of the can, the cap plate comprising a protruding anchor portion; and an insulation plate comprising an anchor hole accommodating the anchor portion, wherein the anchor hole is a slot and is configured to guide movement of the anchor portion within the anchor hole when pressure is applied to the can and the cap plate.

2. The battery pack of claim 1, wherein the anchor hole is asymmetrical with respect to a central line along a lengthwise direction of the insulation plate.

3. The battery pack of claim 2, wherein the cap plate comprises a first concave lateral surface and a second convex lateral surface, the first and second lateral surfaces being aligned with each other.

4. The battery pack of claim 3, wherein a distance from the central line of the insulation plate to an end of the anchor hole nearer the second lateral surface is smaller than a distance from the central line of the insulation plate to an end of the anchor hole nearer the first lateral surface.

5. The battery pack of claim 3, further comprising a plurality of anchor holes comprising: a first anchor hole at a first side of the insulation plate spaced from a center of the can; and a second anchor hole at a second side of the insulation plate opposite to the first side and spaced from the center of the can.

6. The battery pack of claim 5, wherein a first distance between the center of the can and the first anchor hole and a second distance between the center of the can and the second anchor hole are different.

7. The battery pack of claim 6, wherein the first distance is greater than the second distance.

8. The battery pack of claim 5, wherein a line passing through the center of the first anchor hole in a lengthwise direction is at a predetermined angle to the central line of the insulation plate.

9. The battery pack of claim 5, wherein the insulation plate comprises a mounting portion accommodating a terminal plate, wherein a distance between a side of the mounting portion adjacent to the first anchor hole and an inner edge of the first anchor hole decreases from the second lateral surface toward the first lateral surface.

10. The battery pack of claim 5, wherein a width of the first anchor hole increases from the second lateral surface toward the first lateral surface.

11. The battery pack of claim 5, wherein the anchor portion comprises a first anchor portion accommodated in the first anchor hole and a second anchor portion accommodated it the second anchor hole.

12. The battery pack of claim 11, wherein a cross-section of the first anchor portion is greater than a cross-section of the second anchor portion.

13. The battery pack of claim 1, wherein the cap plate comprises a first cap plate that electrically insulates the electrode assembly and a second cap plate on the first cap plate, wherein the anchor portion is on at least one of the first cap plate and the second cap plate.

14. The battery pack of claim 1, wherein the anchor hole comprises an open end accommodating the anchor portion and coupling the anchor portion to the insulation plate.

15. The battery pack of claim 3, wherein the first lateral surface and the second lateral surface of the cap plate have different curvature radii.

16. The battery pack of claim 15, wherein a difference between the curvature radii of the first lateral surface and the second lateral surface is about 10mm to about 30mm.

17. The battery pack of claim 1, wherein the cap plate is welded to the can from an upper portion of the cap plate along an external surface of the cap plate.

18. A method of manufacturing a battery pack, the method comprising:
  placing an electrode assembly inside a can having an opening;
  fixing an insulation plate to a cap plate and installing the cap plate to cover the opening of the can;
  bonding the cap plate and the can by welding along the edge of the opening of the can; and
  curving the can and the cap plate by applying pressure to the can and the cap plate,H
  wherein the cap plate comprises a protruding anchor portion, and the insulation plate comprises an anchor hole accommodating the anchor portion and configured to guide movement of the anchor portion within the anchor hole when pressure is applied to the can and the cap plate, and
  wherein the anchor hole is a slot, and the anchor portion moves within the anchor hole when pressure is applied to the can and the cap plate.

19. The method of claim 18, wherein the bonding of the cap plate and the can by welding comprises bonding the cap plate and the can by welding the cap plate from an upper portion of the cap plate along an external surface of the cap plate.

* * * * *